UNITED STATES PATENT OFFICE.

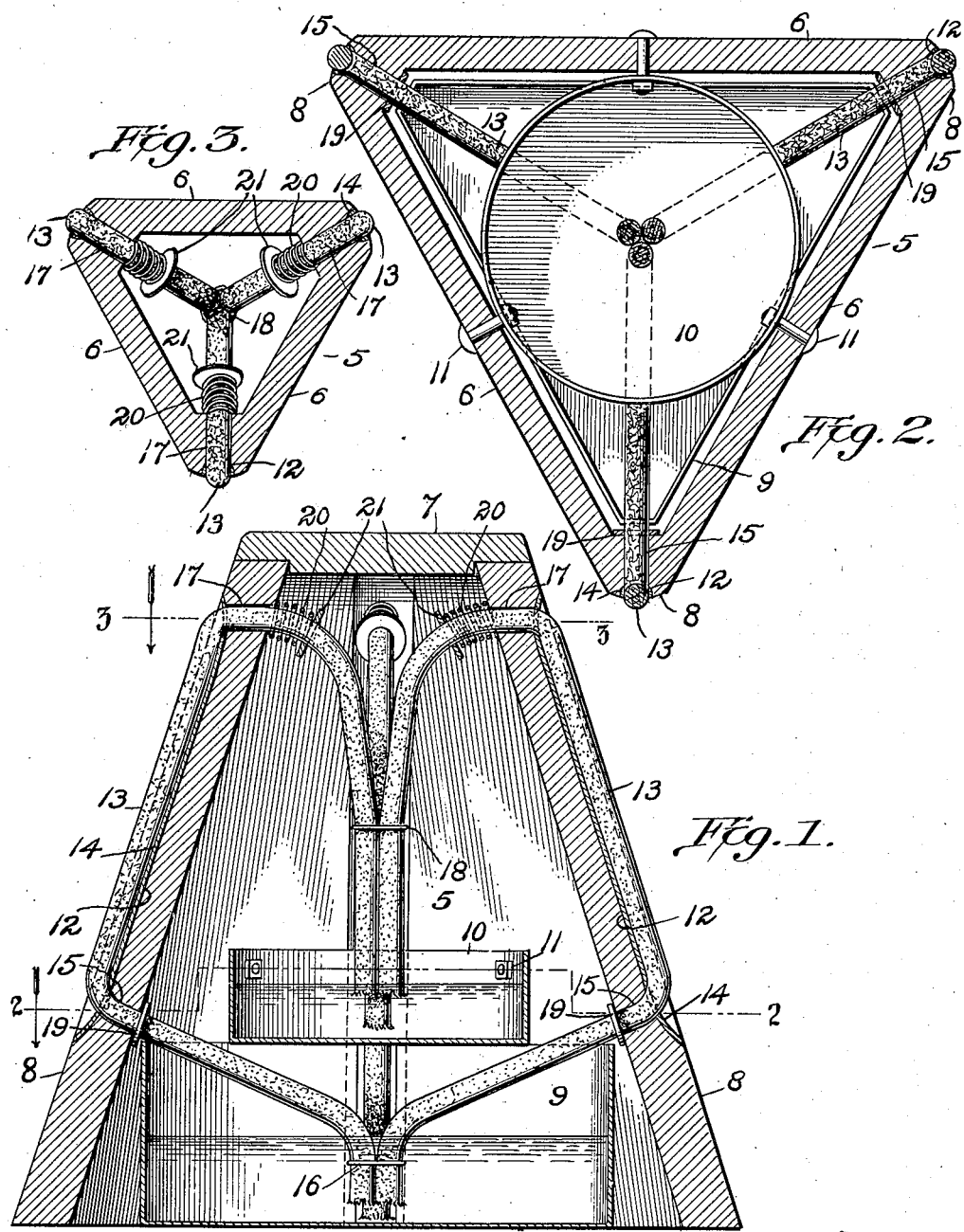

ARTHUR MORRISON, OF HAMILTON, ILLINOIS.

HOG-OILER.

1,360,007.

Specification of Letters Patent.   Patented Nov. 23, 1920.

Application filed July 8, 1919. Serial No. 309,339.

*To all whom it may concern:*

Be it known that I, ARTHUR MORRISON, a citizen of the United States, residing at Hamilton, in the county of Hancock and State of Illinois, have invented certain new and useful Improvements in Hog-Oilers, of which the following is a specification.

The present invention relates to means for applying insecticide and the like to animals, and has more particular relation to that type of device in which the animal rubs against a surface having the material thereon. It is especially adapted for applying oil to hogs.

The object is to provide a simple structure that may be produced at small expense and can be easily placed in any desired location, the said structure having means for effectively supplying oil or insecticide to the parts rubbed against by the animal.

An embodiment of the invention that at present is considered the preferable one, is illustrated in the accompanying drawings, wherein:—

Figure 1 is a vertical sectional view of the device, and Figs. 2 and 3 are horizontal sectional views taken respectively on the lines 2—2 and 3—3 of Fig. 1.

Similar reference numerals designate corresponding parts in all the figures of the drawings.

A body member in the form of a standard 5 is employed, preferably made of vitreous material, earthenware or concrete, said standard comprising angularly disposed flat walls 6 forming a triangle in cross section, with an internal chamber, the upper end of which is closed by a removable cap 7. The meeting portions of the walls provide, in effect, ribs 8, and as the body tapers toward its upper ends, these ribs are thus disposed at an incline.

Within the body is located the insecticide holding means, preferably in the form of a lower pan or reservoir 9 that is triangular in cross section, and an upper circular pan or reservoir 10 located upon the pan 9 and secured to the body by suitable fasteners 11.

The ribs 8 are provided with longitudinal channels 12 in which are placed longitudinally disposed wicks 13 preferably, though not necessarily, backed by sheet metal troughs 14 that assist in preventing the insecticide being absorbed by the walls. The lower portions of the wicks pass through openings 15 in the wall 6 and have their ends fastened together as shown at 16 and submerged in the oil or insecticide placed in the lower reservoir 9. The wicks also pass through openings 17 in the upper ends of the walls 6 and have their inner portions secured together, as illustrated at 18, the ends of said wicks entering the pan or reservoir 10. In order to keep the exposed portions of the wicks in taut condition washers 19 are located on the lower portions of the wicks and bear against the inner faces of the wall 6 at the openings 15, while coiled springs 20 surrounding the upper portions of the wicks bear against the inner face of the wall 6 adjacent to the openings 17 and also bear against washers 21 fixed to the upper portions of the wicks.

The washers 19 also serve as shields which divert rain water that may flow upon the surface of the wicks from passing into the pan 9.

It will be evident that if this device is placed within a pen or inclosure containing hogs the corners or ribs will constitute attractive places against which the animals will rub, and therefore if oil or insecticide is placed in the reservoir, it will permeate the exposed portions of the wicks, and will thus be applied to the animals.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. A device of the character described, comprising a hollow standard having an external longitudinal rib, a fixed absorbent wick located longitudinally on the rib, means for holding the wick stationary and taut, a reservoir in the standard into which the wick extends for supplying insecticide to said wick, and a device surrounding the wick at one side of the reservoir.

2. A device of the character set forth, comprising a standard, a wick located on the exterior thereof, means for supplying insecticide to the wick, and means for maintaining a yielding tension on the wick.

3. A device of the character set forth, comprising a standard, a wick located longitudinally on the exterior of the standard, a reservoir in which the wick is engaged, and a spring engaging the wick for maintaining a yielding tension thereon.

4. A device of the character set forth, comprising a standard having an outstanding rib thereon for the animal to rub against, a wick on said rib, a reservoir in the standard, one end of the wick being engaged in the reservoir, and a spring engaged with the other end of the wick to place yielding tension thereon.

5. In a device of the character set forth, the combination with a tubular standard having a plurality of outstanding rubbing ribs thereon, a reservoir located in the lower end of the standard, a plurality of wicks extending longitudinally of the ribs and having their lower ends in the reservoir, and springs engaged with the upper portions of the wicks to hold the same in taut condition.

6. In a device of the character set forth, the combination with an upright standard, of insecticide holding pans located within the standard, one above the other, and a wick located longitudinally upon the exterior of the standard and having its upper end in the upper pan and its lower end in the lower pan.

7. In a device of the character set forth, the combination with a hollow standard, of separate reservoirs located within the standard, one above the other, and a wick located on the exterior of the standard and having its ends respectively in the said reservoirs.

8. In a device of the character set forth, the combination with a body having an external rib, of upper and lower reservoirs, and a wick having its ends in the reservoirs and located longitudinally along the rib.

9. In a device of the character set forth, the combination with a hollow body substantially triangular in cross section, forming rubbing ribs, of upper and lower insecticide reservoirs in the body, and wicks located longitudinally along the ribs and having their ends in the said reservoirs.

10. In a device of the character set forth, the combination with a hollow standard, of insecticide containing means within the standard, a wick on the exterior of the receptacle having a portion extending into the containing means, and a washer surrounding the wick at one side of the containing means.

11. In a device of the character set forth, the combination with a hollow standard having an open top, of a removable cover for the top, a lower reservoir in the standard, an upper reservoir above the lower reservoir and accessible through the open top, an absorbent wick located on the exterior of the standard and having its upper portion engaged in the upper reservoir and its lower portion engaged in the lower reservoir, and washers surrounding the end portions of the wick outside the reservoir.

In testimony whereof I affix my signature in the presence of two witnesses.

ARTHUR MORRISON.

Witnesses:
W. N. Dennis,
N. E. Guthrie.